United States Patent [19]
Burton

[11] 4,063,406
[45] Dec. 20, 1977

[54] HARVESTING MACHINE

[75] Inventor: Charles G. Burton, Lewiston, N.Y.

[73] Assignee: Chisholm-Ryder Company, Inc., Niagara Falls, N.Y.

[21] Appl. No.: 330,639

[22] Filed: Feb. 8, 1973

[51] Int. Cl.² .......................................... A01D 46/00
[52] U.S. Cl. .................................................... 56/330
[58] Field of Search ................. 56/330, 327 R, 328 R, 56/331, 10.2, 10.4

[56] References Cited

U.S. PATENT DOCUMENTS

| | | | |
|---|---|---|---|
| 3,439,482 | 4/1969 | Orton | 56/330 |
| 3,449,895 | 6/1969 | Pertics | 56/330 |
| 3,559,386 | 2/1971 | Popor et al. | 56/331 |
| 3,561,205 | 2/1971 | Baker | 56/328 R |
| 3,611,689 | 10/1971 | Patzlaff | 56/330 |
| 3,636,688 | 1/1972 | Fontan et al. | 56/330 |
| 3,667,201 | 6/1972 | Claxton et al. | 56/330 |
| 3,685,266 | 8/1972 | Mohn et al. | 56/330 |
| 3,703,072 | 11/1972 | Patzlaff | 56/330 |
| 3,713,282 | 1/1973 | Baker | 56/328 R |
| 3,727,388 | 4/1973 | Smith | 56/330 |
| 3,766,724 | 10/1973 | Paillou | 56/331 |
| 3,774,381 | 11/1973 | Burton | 56/330 |

FOREIGN PATENT DOCUMENTS

| | | | |
|---|---|---|---|
| 2,111,080 | 2/1972 | France | 56/330 |
| 1,927,793 | 12/1970 | Germany | 56/10.4 |

*Primary Examiner*—Russell R. Kinsey
*Attorney, Agent, or Firm*—Joseph P. Gastel

[57] ABSTRACT

A harvesting machine for harvesting produce, especially grapes, from a row of plants comprising a frame movable alongside said row of plants, first and second modules on said frame located in straddling relationship to said row of plants, shaker arms extending toward said plants from said modules, a first linkage for oscillating said shaker arms so as to shake produce from said plants, a second linkage for selectively coupling said modules for coupled rectilinear rolling movement on said frame transversely of said row of plants as required by the contour of said row or for permitting independent rectilinear rolling movement of each module independently of the other transversely of the row of plants, first adjusters for selectively varying the spacing between the modules in either of the foregoing conditions, first adjusters for varying the biasing force with which the modules are urged toward said row of plants, and third adjusters for selectively varying the inclination of said modules and the shaker arms carried thereby relative to the vertical. In addition, structure is provided for varying the spacing between the modules and varying their inclination from a remote position. The foregoing features may be incorporated into a harvester either singly or in combination, where they are not mutually exclusive.

20 Claims, 26 Drawing Figures

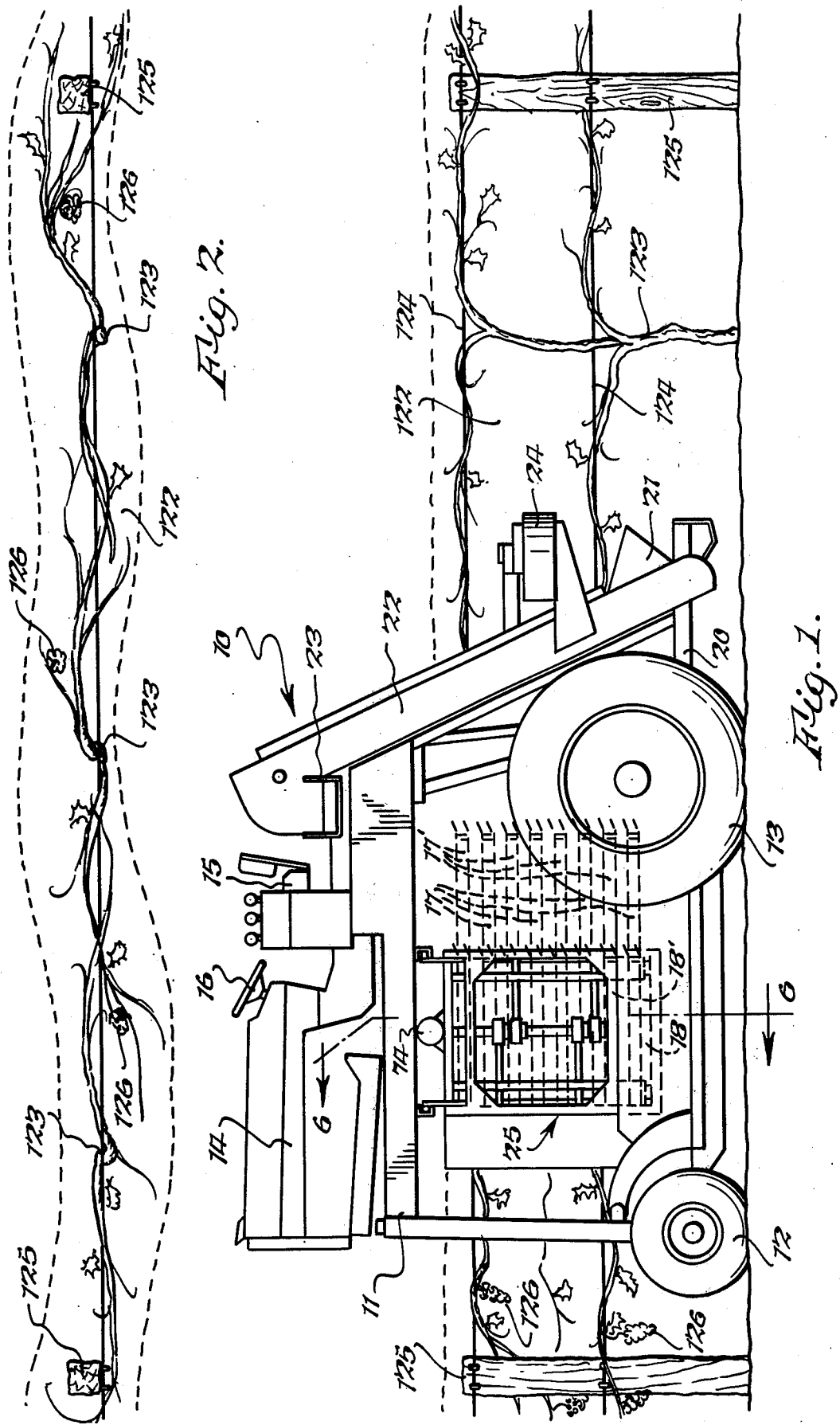

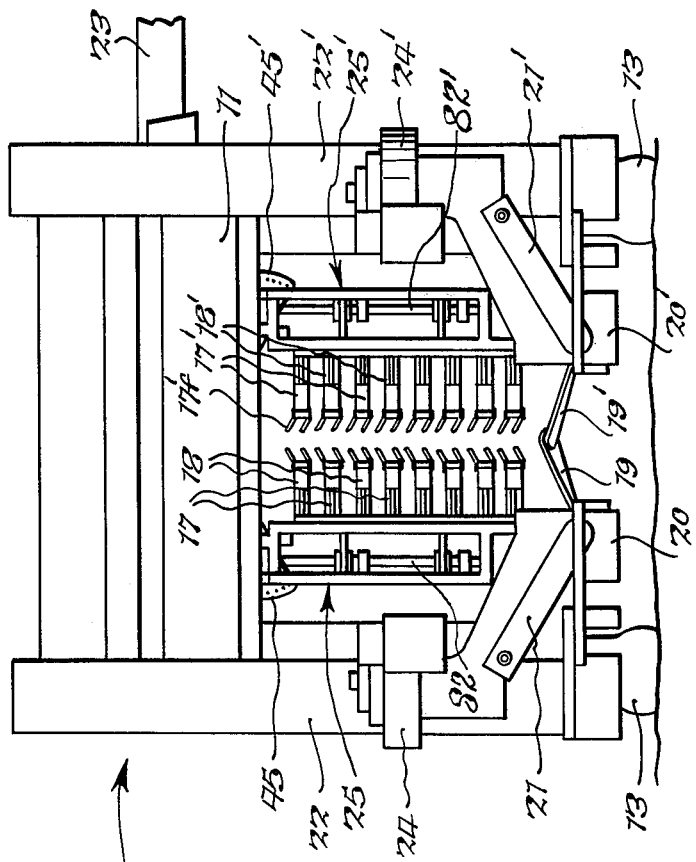
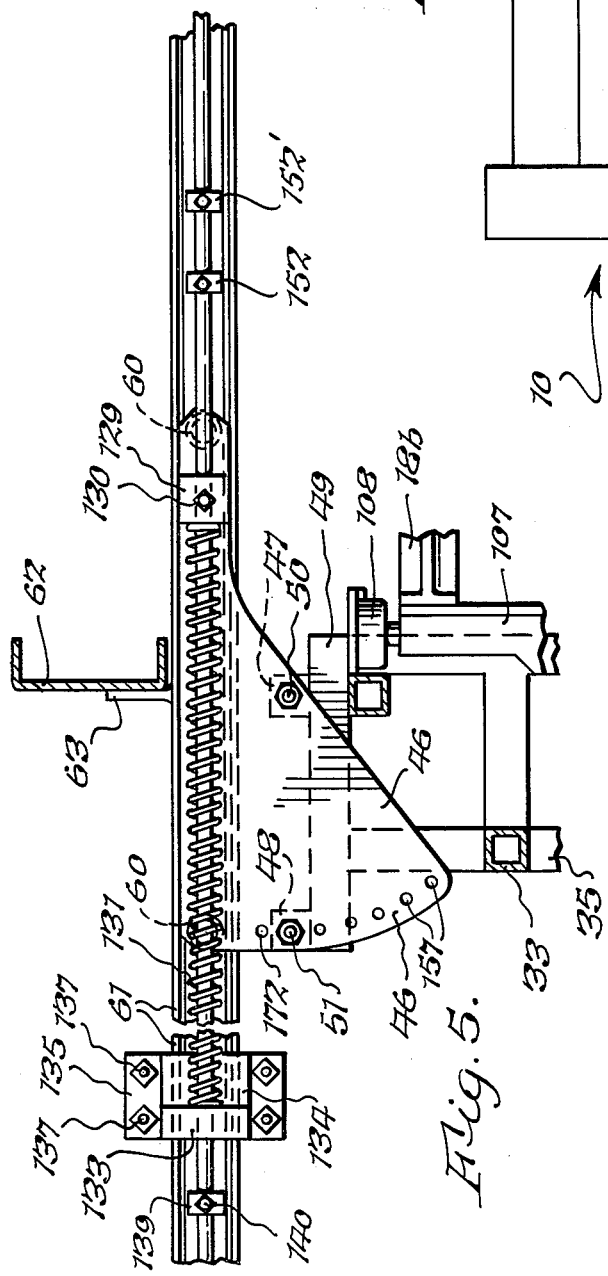
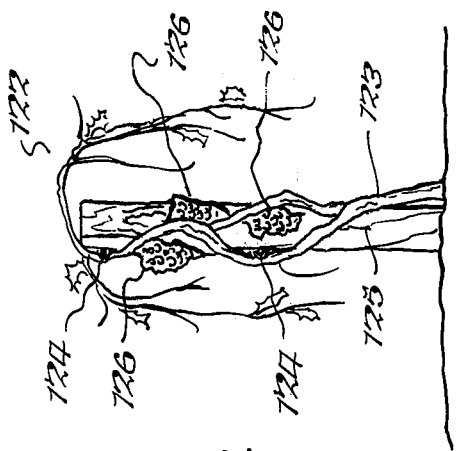

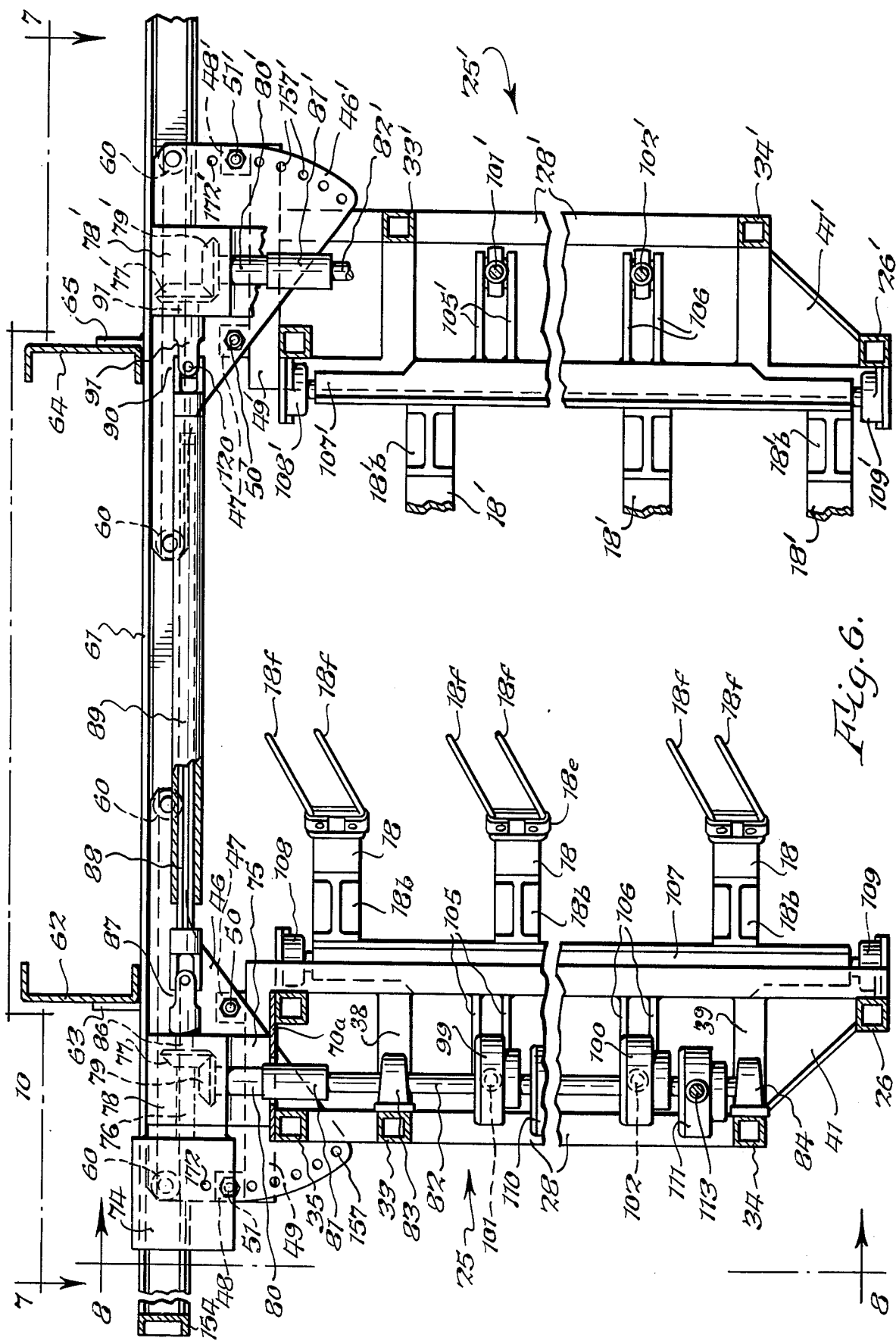

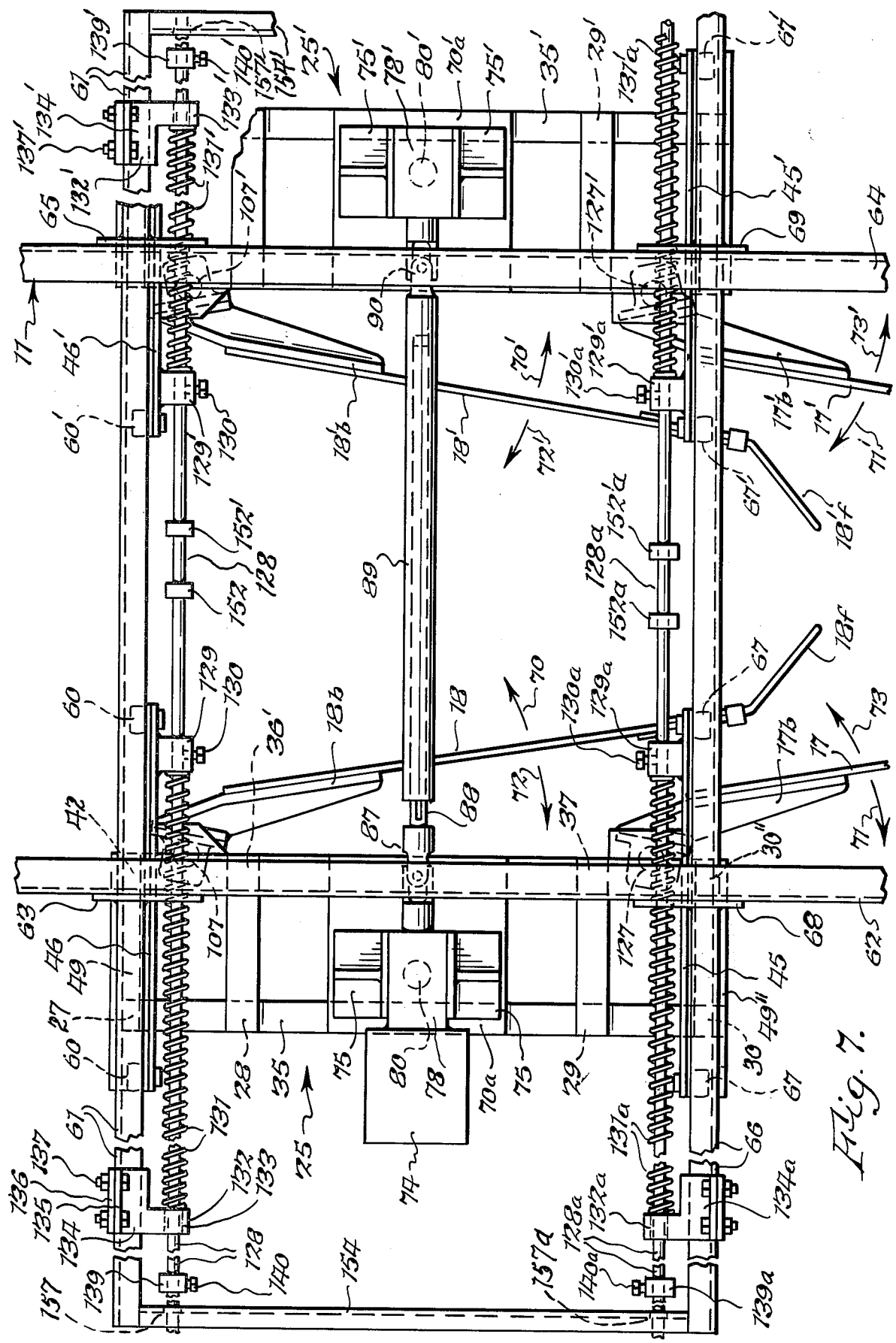

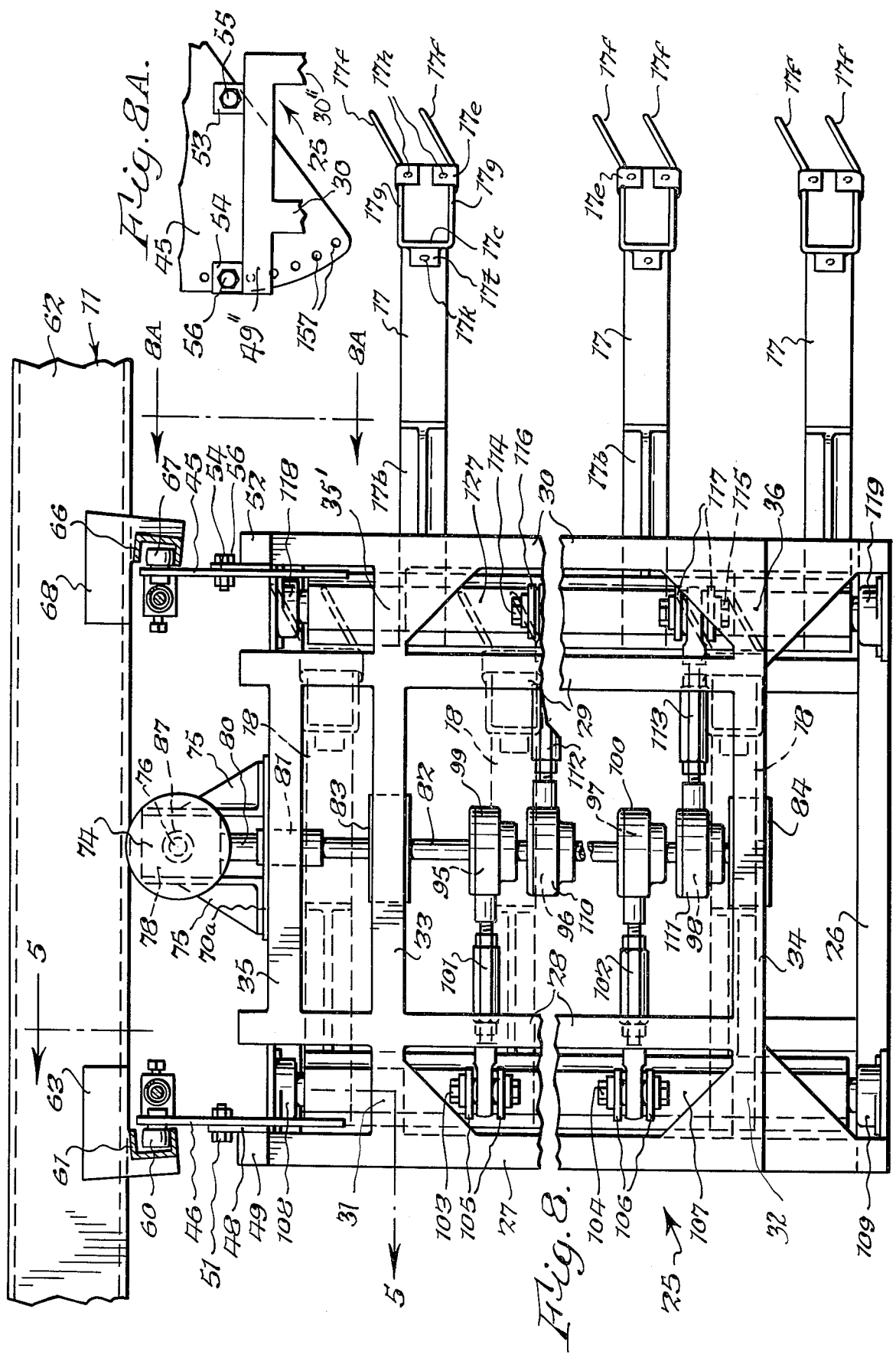

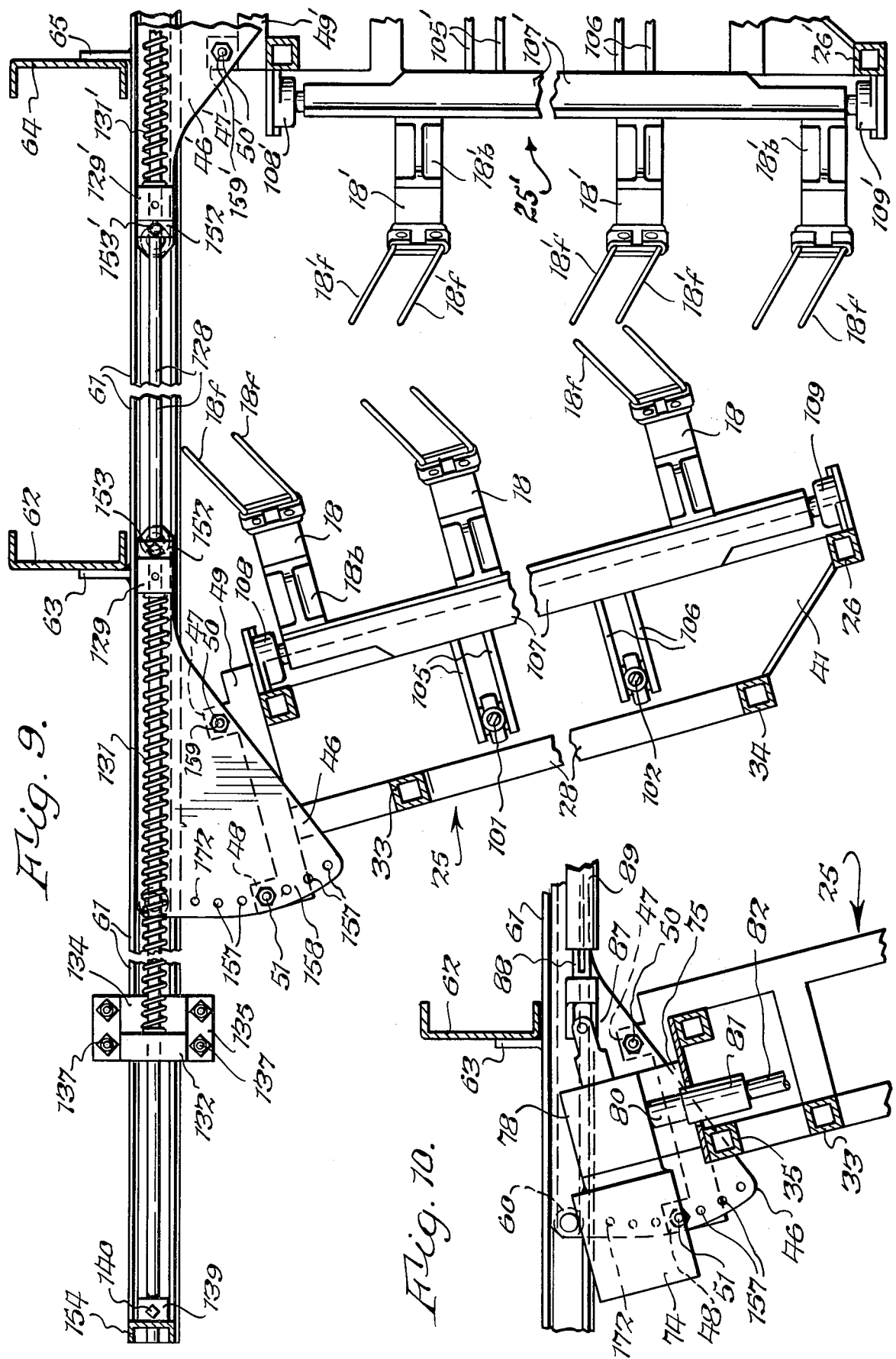

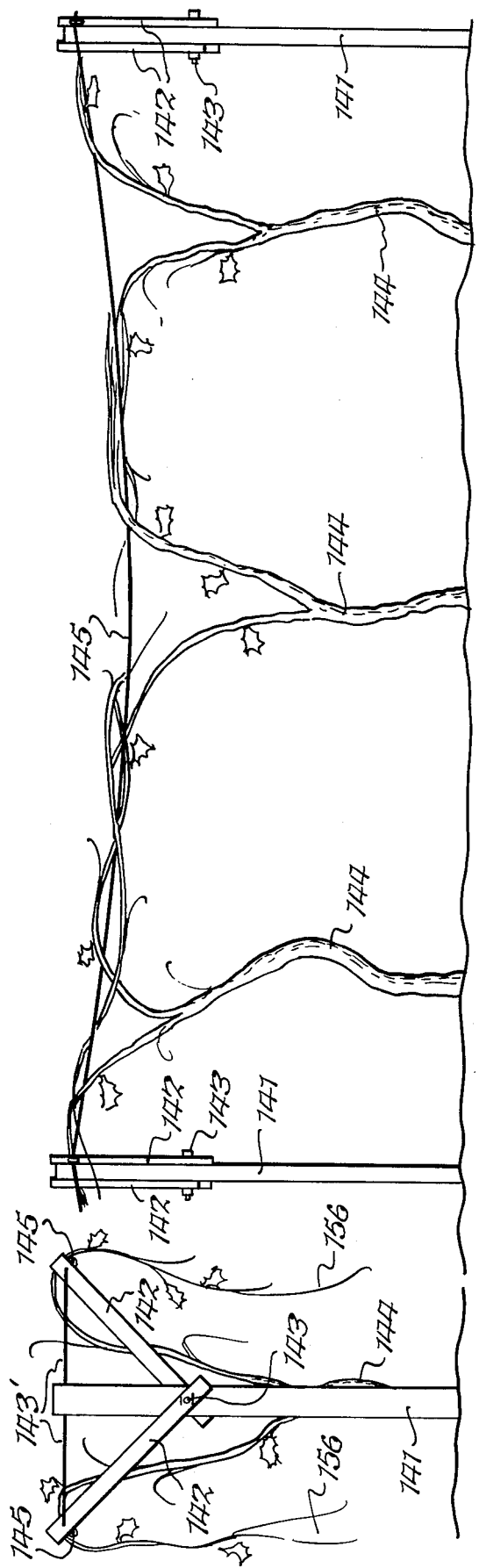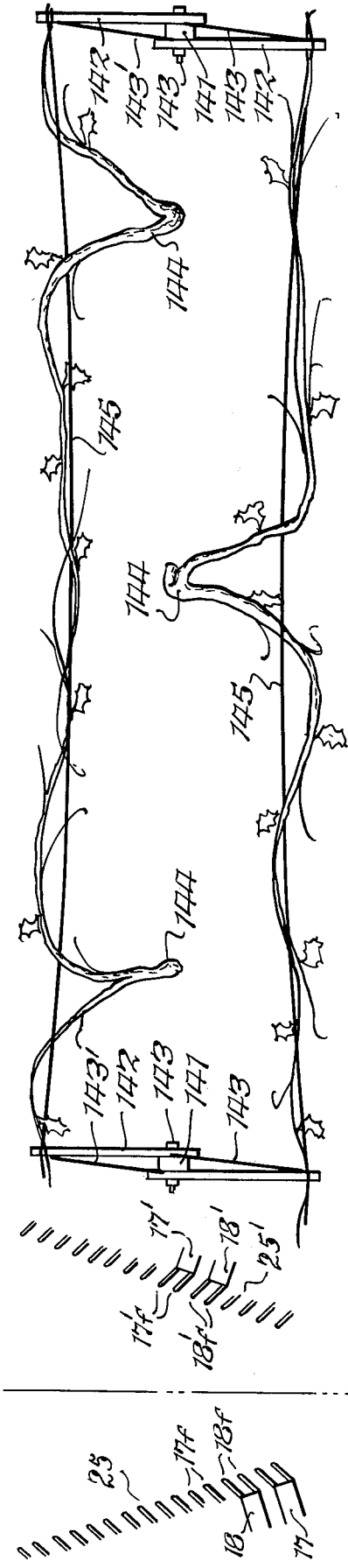

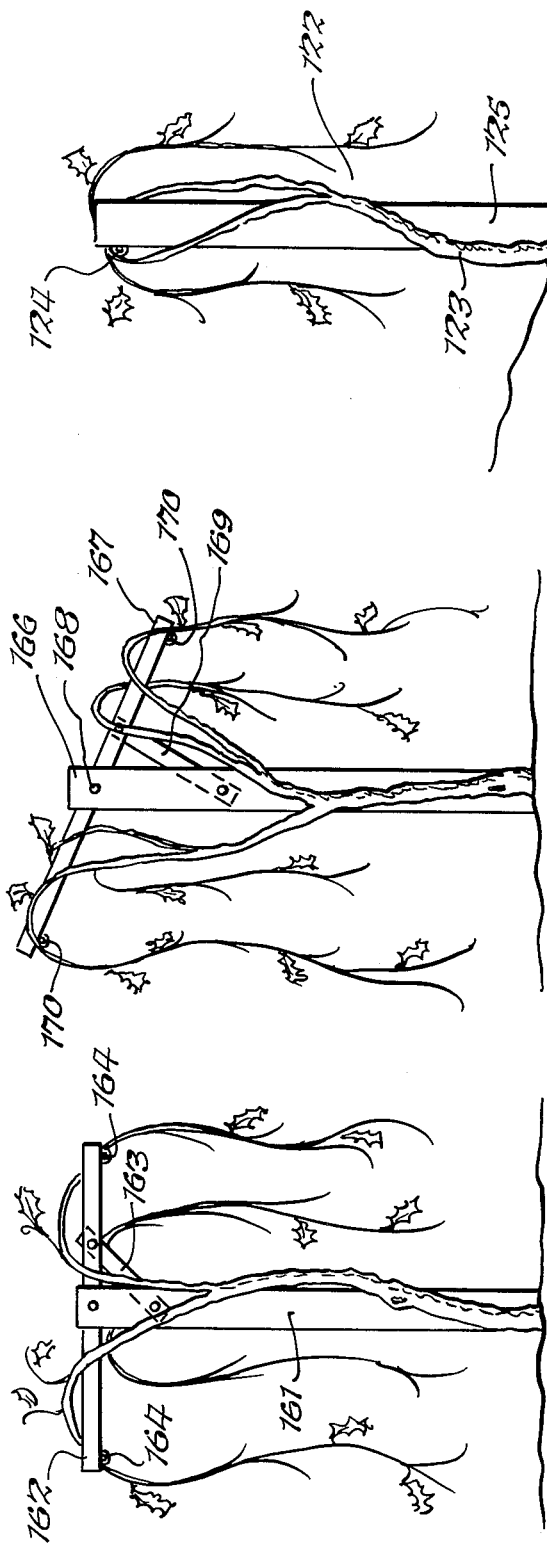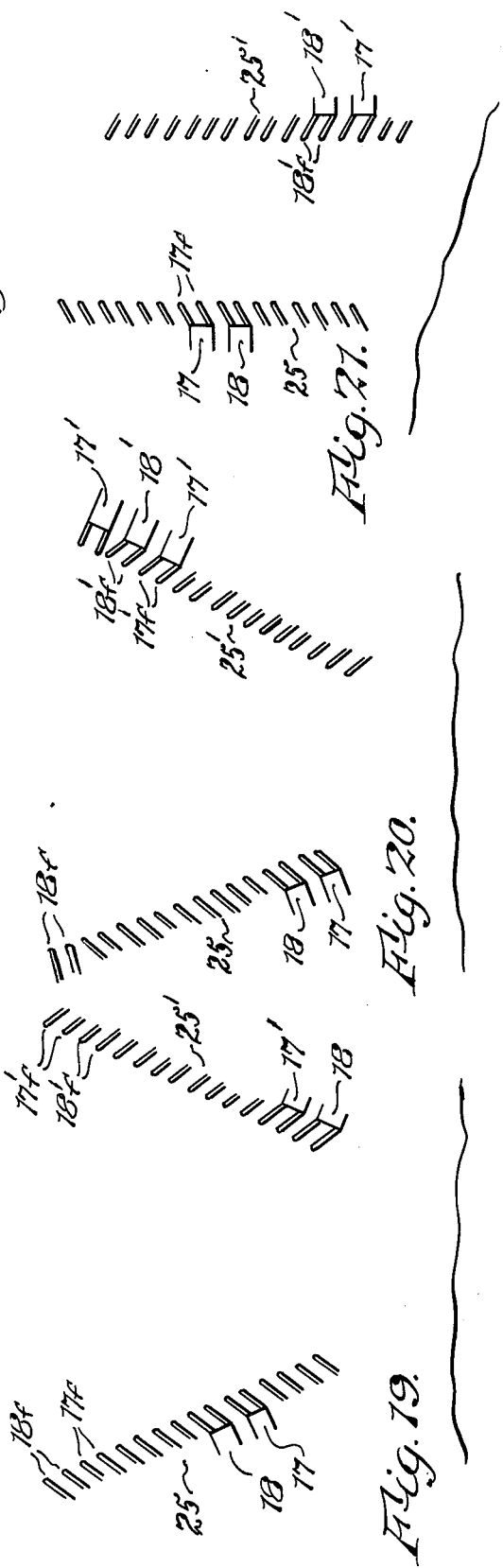

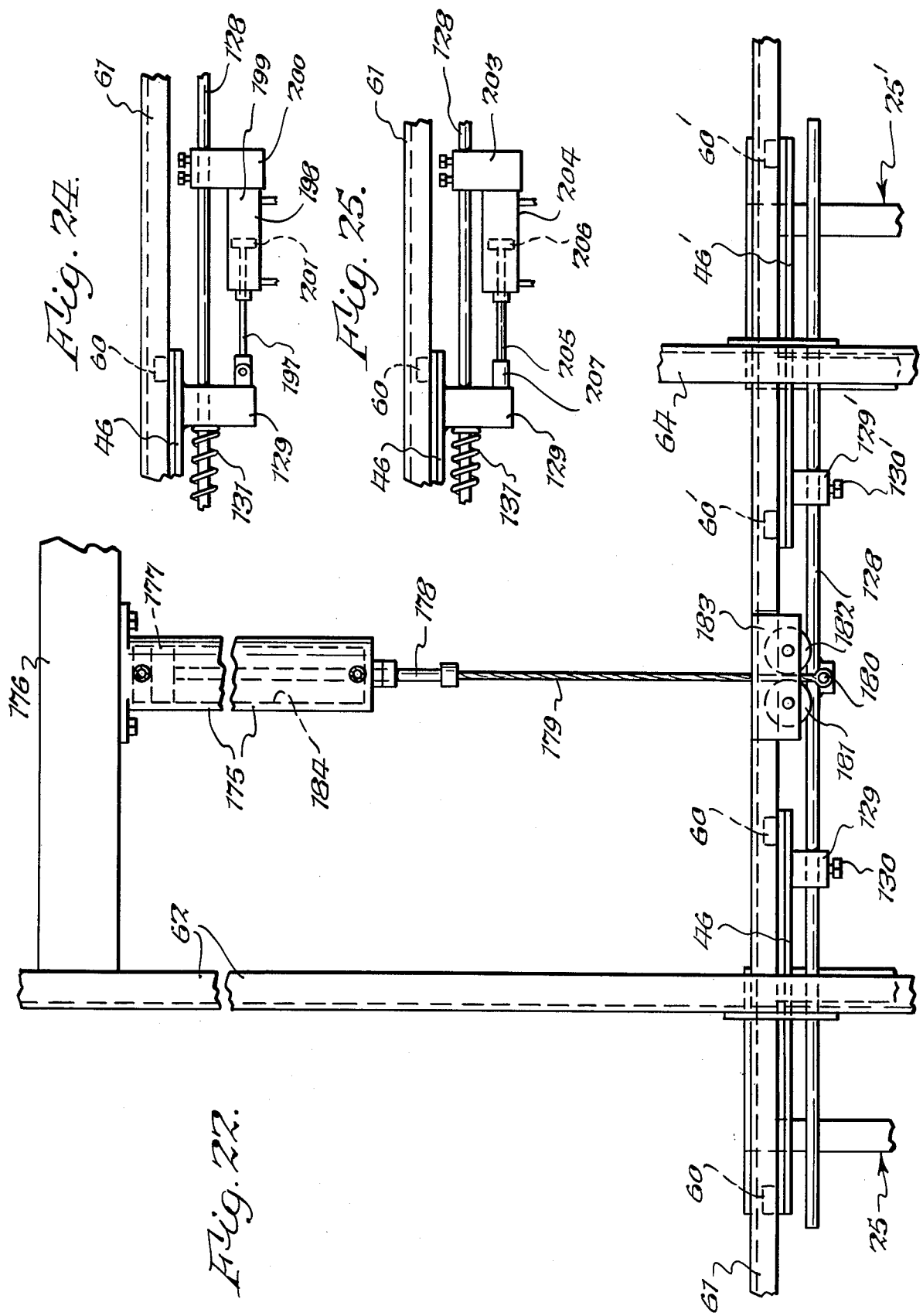

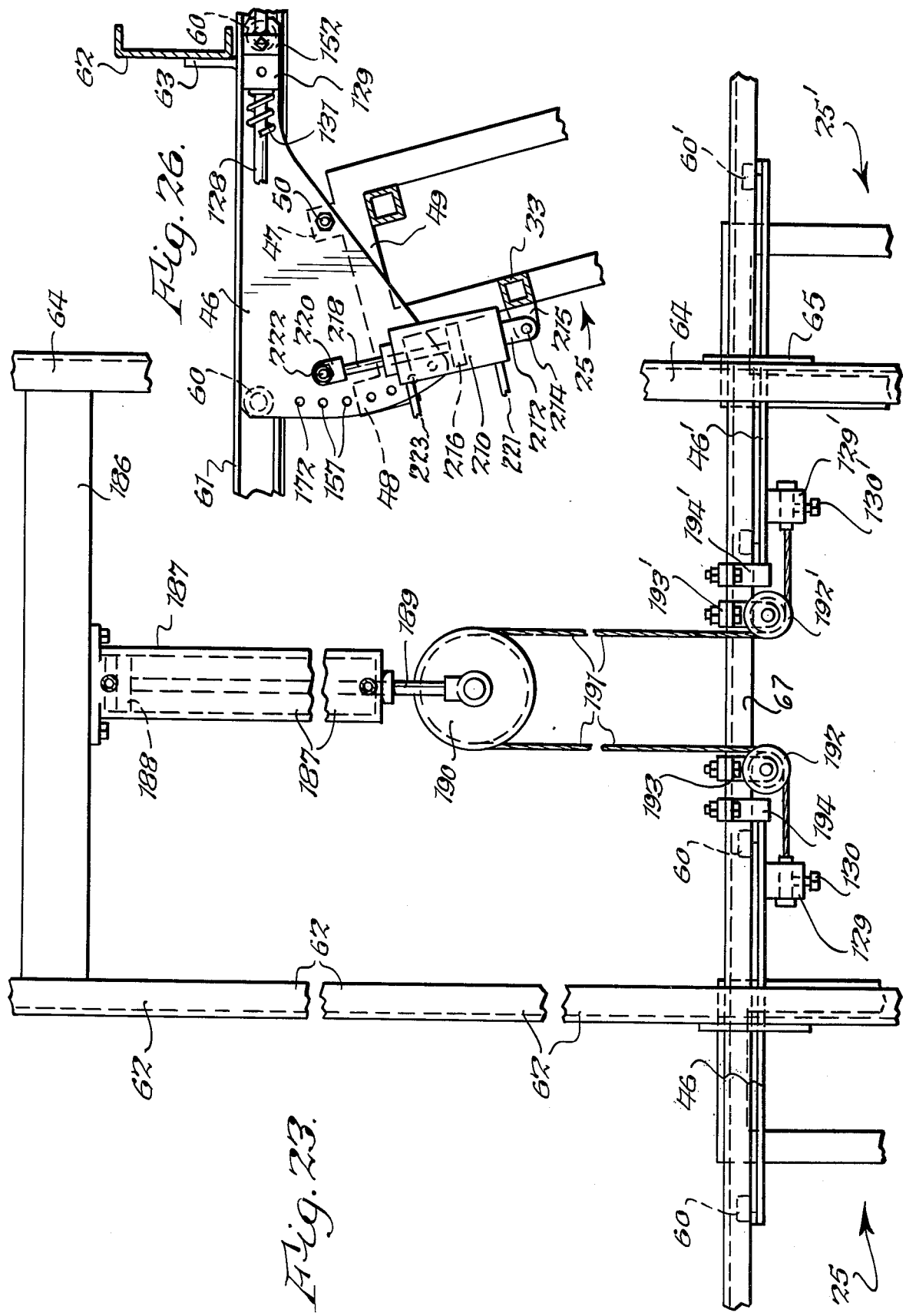

HARVESTING MACHINE

The present invention relates to an improved harvesting machine for harvesting produce grown on plants in a row and more particularly to an universal grape harvester capable of rapid adjustment to harvest grapes from different types of grapevine formations and different varieties of grapes.

By way of background, grapes are grown commercially on different types of grapevine formations. For example, there is the single curtain type of formation wherein the vines are trained along wires which extend between posts forming a row. There is also the Geneva double curtain grapevine formation wherein the grapevines are trained to produce two spaced curtains hanging from spaced wires supported by the outer ends of V-shaped cross bars supported at the tops of posts forming a row. In addition, there is the T-top type of grapevine formation wherein the grapevines grow along and between wires attached between the outer ends of cross bars attached to posts to form a T. Also, there is another type of grapevine formation wherein the grapevines are supported by wires strung between cross bars mounted on a slant at the tops of posts forming a row. There are also other ways in which grapevines are grown.

In the past the adjustment of a grape harvesting machine for use with the different types of grapevine formations was a time consuming and costly task, if the harvester was capable of adjustment at all. In addition, in certain types of growth, such as the Geneva double curtain mentioned briefly above, the vines tended to approach and recede from each other in plan during harvesting, therefore making it difficult or impossible for the harvester to maintain the desired degree of contact with the vines and the grapes at all times. In addition, in the past there was no known way of mounting the harvesting arms of a grape harvester for efficient movement in following the contour of the grapevine formations so as to obtain optimum harvesting. It is with overcoming the above described deficiencies of prior grape harvesters that the present invention is concerned.

It is accordingly one object of the present invention to provide an universal grape harvester which can be adjusted easily and quickly for harvesting different varieties of grapes and grapes from different types of grapevine formations by selectively providing any of a number of different types of operation, either individually or in combination, as appear in the subsequent statement of objects of this invention and in the following specification.

It is another object of the present invention to provide an improved grape harvester which can be adjusted to selectively permit the harvesting arms which engage the opposite sides of the grapevines to move in coupled relationship to actually follow the undulating contour of grapevine rows so as to maintain the vines centered between them for the purpose of removing the grapes therefrom in an optimum manner. A related object of the present invention is to provide an improved grape harvester capable of producing this type of coupled-arm operation and in which the spacing between the coupled arms on opposite sides of the vines can be adjusted quickly and easily for different thicknesses of vine growth. A further related object of the present invention is to provide an improved grape harvester of this type in which the coupled harvesting arms have a relatively large range of movement transversely of the harvester so as to accommodate large variations in contour of the row of grapevines which are being acted on. A still further related object of the present invention is to provide an improved grape harvester of this type in which the force of the coupled arms on the opposite sides of the vines may be always substantially the same regardless of their transverse position on the harvester.

A further object of the present invention is to provide an improved grape harvester in which the harvesting arms which engage the opposite sides of the vines can be selectively adjusted for movement independently of each other toward and away from the vines so as to maintain the desired degree of contact with the opposite sides of the grapevines. A related object of the present invention is to provide an improved grape harvester capable of providing this type of independent operation and in which the minimum spacing between the arms which engage the opposite sides of the vines can be adjusted quickly and easily for different thickness of growth and for varying picking efficiencies. A further related object of the present invention is to provide an improved grape harvester in which the independently movable harvesting arms on opposite sides of the vines have a relatively large range of movement transversely of the machine so as to be capable of accommodating great variations in contour of the row of grapevines. Yet another related object of the present invention is to provide an improved grape harvester having independently movable arms in which the force between the arms and the opposite sides of the vines may always be the same regardless of their transverse position on the harvester.

Yet another object of the present invention is to provide an improved grape harvester in which each series of arms which engage each side of the vines can be inclined at a different angle relative to the row of grapevines so as to obtain the optimum degree of engagement between the arms and each side of the vines.

A still further object of the present invention is to provide an improved grape harvester in which the degree of inclination of the series of arms on each side of the harvester can be adjusted simply and easily. A related object of the present invention is to provide an improved grape harvester in which the above-mentioned inclination of the arms may be utilized, if desired, both when the series of arms on each side of the harvester are coupled for movement relative to the vines or are mounted for independent movement relative to the vines.

Yet another object of the present invention is to provide an improved grape harvester in which the degree of inclination of the harvesting arms on each side of the harvester can be adjusted from a remote position while the harvester is in operation thereby adapting the harvester to different conditions and different types of terrain while it is actually moving along rows of grapevines and harvesting them.

A further object of the present invention is to provide an arrangement for varying the spacing between the series of harvesting arms on each side of the harvester from a remote position while the harvester is moving along the rows of grapevines and harvesting grapes from them, to thereby rapidly adjust the harvester for optimum operation under all conditions.

Other objects and attendant advantages of the present invention will be perceived readily hereafter.

The improved harvester of the present invention includes a plurality of features which may be used either individually or in combination. More specifically, the harvester includes a frame, harvesting arms on said frame for straddling a row of vines, means mounting said arms on said frame for coupled movement transversely of the vines or for independent movement relative to the vines, means for inclining the arms to the vertical so as to provide the desired degree of engagement with the vines, means for varying the force with which the arms engage the opposite sides of the vines, and means for adjusting the spacing between the arms. In addition, means may be provided for adjusting both the spacing between the arms and the inclination of the arms from a remote position. The various aspects of the present invention will be more fully understood when the following portions of the specification are read in conjunction with the accompanying drawings wherein:

FIG. 1 is a side elevational view of the improved grape harvester of the present invention in relation to grapevines grown in a single curtain formation;

FIG. 2 is a schematic view showing the undulating characteristics of the grapevines of FIG. 1 in plan;

FIG. 3 is an end elevational view of the single curtain type of grapevine formation;

FIG. 4 is a view of the harvester from the rear, which is taken from the right of FIG. 1;

FIG. 5 is a fragmentary cross sectional view taken substantially along line 5—5 of FIG. 8 and showing particularly the various linkages utilized in effecting coupled movement of the harvester modules which carry the shaker arms;

FIG. 6 is an enlarged cross sectional view taken generally along line 6—6 of FIG. 1 and showing in the left portion of FIG. 6 the mechanism to the right of the drive shaft on the module on the near side of the machine and showing in the right portion of FIG. 6 certain of the linkages to the left of the drive shaft on the module on the far side of the machine;

FIG. 7 is a plan view taken substantially in the direction of line 7—7 of FIG. 6 and showing the various details of the structure utilized in effecting coupled movement of the modules transversely of the machine;

FIG. 8 is a side elevational view taken substantially along line 8—8 of FIG. 6 and showing primarily the drive linkage for the harvester module and the structure for suspending it from the frame of the harvester;

FIG. 8A is a fragmentary view taken along line 8A—8A of FIG. 8;

FIG. 9 is a fragmentary view similar to FIG. 5 but showing the linkage adjusted to permit the modules to reciprocate rectilinearly independently of each other and also showing the mechanism for inclining the modules relative to the vertical;

FIG. 10 is a fragmentary view similar to FIG. 9 but showing the manner in which the drive linkage functions to maintain a drive to the harvester module in a tilted position of the latter;

FIG. 12 is an end elevational view of a Geneva double curtain type of grapevine formation;

FIG. 13 is a side elevational view of the Geneva double curtain type of grapevine formation;

FIG. 14 is a plan view of the Geneva double curtain grapevine formation shown in FIG. 13;

FIG. 15 is a schematic view showing the manner in which the inclined harvester modules coact with the grapes of the Geneva double curtain formation;

FIG. 16 is an end elevational view of a T-top type of grapevine formation;

FIG. 17 is an end elevational view of a slant top type of grapevine formation;

FIG. 18 is an end elevational view of a single curtain type of grapevine formation, such as shown in FIGS. 2 and 3, but which is grown on a hill;

FIG. 19 is a schematic view of harvester modules which may be used in harvesting grapes grown on a T-type grapevine formation shown in FIG. 16 with the harvester modules inclined at equal angles to the vertical;

FIG. 20 is a schematic view of the unequal inclination of the opposed harvester modules for utilization with the slant top type of grapevine formation of FIG. 17;

FIG. 21 is a schematic view of the harvester modules oriented so as to provide effective harvesting engagement with grapevines grown in a single curtain on an incline, as shown in FIG. 18;

FIG. 22 is a fragmentary plan view of an alternate embodiment of the invention which will provide coupled movement of the harvester modules;

FIG. 23 is a fragmentary plan view of an alternate embodiment of the invention which will provide independent reciprocating movement of the harvester modules;

FIG. 24 is a fragmentary view showing an arrangement for providing remotely controlled outward and inward movement of each of the modules relative to the centerline of the machine, as desired, to thereby vary the spacing therebetween when the modules are mounted on the machine for the coupled movement shown in FIGS. 5–8;

Figure 11:
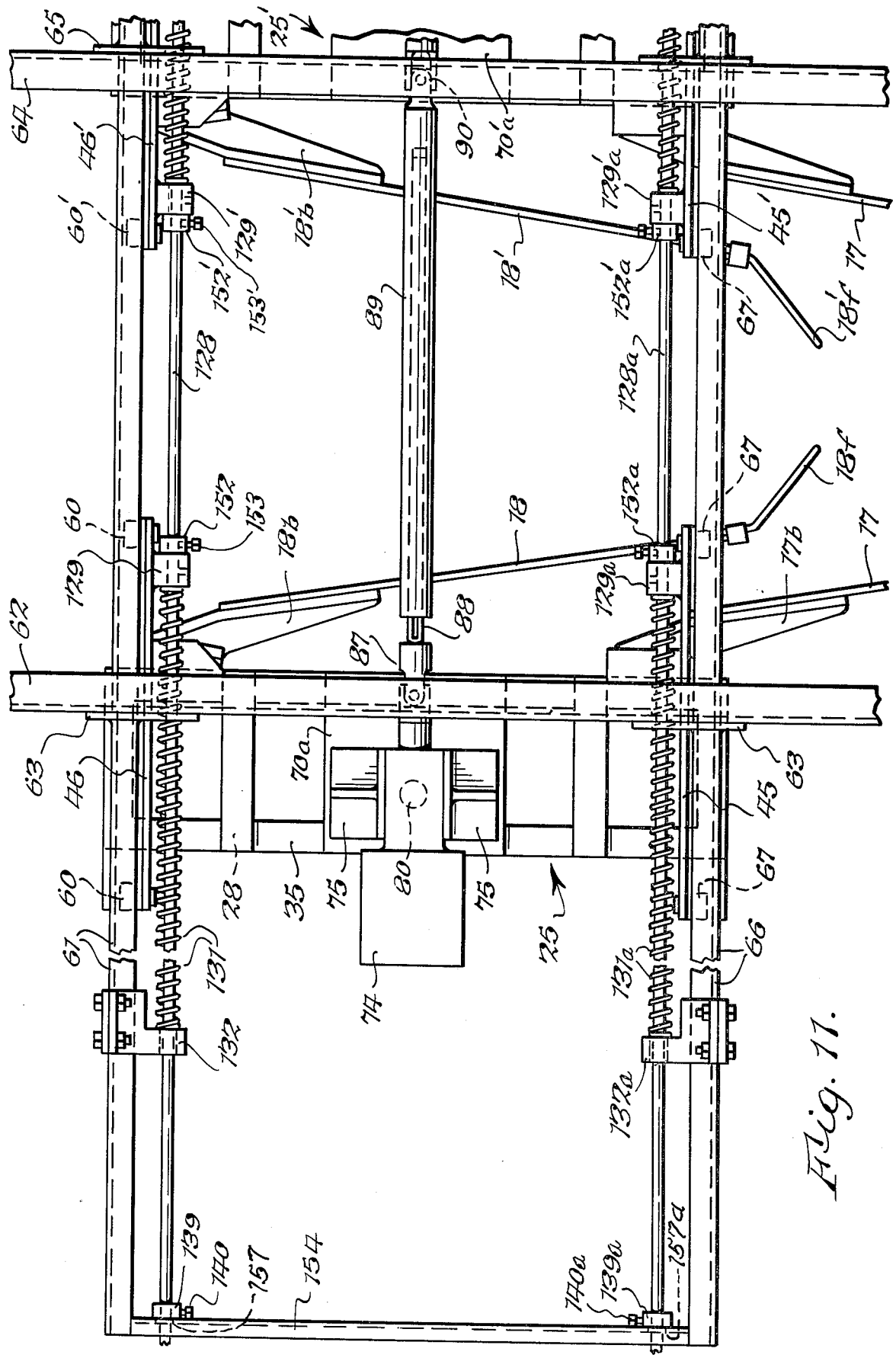
FIG. 11 is a plan view similar to FIG. 7 but showing the linkage in the adjusted condition for permitting independent reciprocating movement of the harvester modules.

FIG. 25 is a fragmentary view of an alternate embodiment of the present invention for causing the spacing between the modules to be varied from a remote position when they are mounted for the independent reciprocating movement shown in FIGS. 9–11; and FIG. 26 is a fragmentary view of an alternate embodiment of the present invention for varying the inclination of the harvester modules by means of a fluid pressure arrangement from a remote position to thereby cause such inclination to conform to the grapevines with which the harvester is being used.

The improved harvester 10 of the present invention is intended for use in harvesting grapes grown in various ways including, but not limited to, the single curtain formation, as shown in FIGS. 2, 3 and 18, the Geneva double curtain formation shown in FIGS. 12–14, the T-top formation shown in FIG. 16, and the slant top formation shown in FIG. 17. The improved harvester 10 is adjustable readily for use with any of the foregoing types of grapevine formations and can be converted simply and easily for use with any type with a minimum of effort. In addition, because of its versatility, as will become more apparent hereafter, it will be appreciated that the present harvester can be used with other types of grape formations also.

Broadly, the improved grape harvester 10 of the present invention includes a frame 11 mounting a pair of front wheels 12 and a pair of rear wheels 13. The harvester 10 is driven by an engine 14 mounted on the top of frame 11 and the operator sits in the seat 15 and steers the vehicle in straddling relationship to a row of grapevines by manipulating steering wheel 16 which is suitably coupled to front wheels 12 through an appropriate linkage.

As the harvester 10 moves along the row of grapevines, the rear shaker arms 17-17' and front shaker arms 18-18' and the picking fingers at the ends thereof engage and manipulate the grapevines to cause the grapes to fall on catcher leaves or plates 19 and 19' at the bottom of the harvester from which they pass onto conveyors 20 and 20' which move them rearwardly to first elevator conveyors 21 and 21' from which they pass onto second elevator conveyors 22 and 22', and from which the grapes pass to a delivery conveyor 23 which drops them into containers mounted on a truck which travels in parallelism with harvester 10 along the rows of grapevines. Suitable fan arrangements 24 and 24' are mounted above first elevator conveyors 21 and 21', respectively, to separate the leaves and other undesirable components from the grapes as they pass from the first elevator conveyors 21-21' to the second elevator conveyors 22-22'.

The series of alternating shaker arms 17-18 and 17'-18' (FIG. 4) are mounted on harvester modules 25 and 25', respectively, which in turn are suitably mounted on the frame of the machine. Harvester module 25 is fabricated from a framework of vertical tubular members 27, 28, 29 and 30 (FIGS. 6 and 8). Members 27 and 28 are welded to the opposite ends of tubular members 31 and 32. Members 28 and 29 are welded to the opposite ends of tubular members 33, 34 and 35 and vertical members 29 and 30 are welded to the opposite ends of tubular members 35' and 36. Horizontal tubular member 26 extends across the bottom of module 25 (FIGS. 6 and 8). Suitable other bracing struts (not numbered), which may be analogous to horizontal bracing struts 31-36 (FIG. 8), are associated with vertical members 36', 37 and the vertical posts 42 and 30" to rigidize module 25. Horizontal struts 38 and 39 extend between vertical member 27 and member 42 parallel thereto (FIG. 6) and struts (not shown) analogous to 38 and 39 extend between posts 30 and 30". Certain other of the bracing struts of module 25 are not shown in the interest of clarity and brevity. Suitable cover plates (not shown) cover the above described frame of module 25. While certain framework has been shown for module 25, it will be appreciated that any suitable framework can be used which will permit it to function properly. Module 25' is generally the mirror image of module 25 and therefore a detailed description of its structural characteristics will be omitted in the interest of brevity.

Harvester modules 25 and 25' are suspended from spaced carrier plates 45-46 and 45'-46', respectively. In this respect tabs 47 and 48 are secured to cross bar 49 of module 25, as by welding, and bolts 50 and 51 extend through aligned holes in carrier plate 46 and in tabs 47 and 48, respectively. Carrier plate 45 is of the same shape as carrier plate 46 and is secured to module 25 by bolts 55 and 56 which extend through aligned holes in carrier plate 45 and in tabs 53 and 54, which are analogous to tabs 47 and 48, respectively, and tabs 53 and 54 are secured, as by welding, to cross frame member 49" of module 25. Carrier plates 45' and 46', which are mirror images of carrier plates 45 and 46, respectively, mount module 25' by means of bolts and tabs designated by primed numerals which correspond to the unprimed numerals associated with like structure associated with carrier plates 45 and 46. Carrier plate 46 has rollers 60 secured thereto which are received in a track consisting of channel 61 which is secured across main frame members 62 and 64 of harvester 10 by means of brackets 63 and 65, respectively. Carrier plate 45 is mounted for rolling movement in a track consisting of channel 66 by means of rollers 67 secured to plate 45. Channel 66 is secured to main frame members 62 and 64 of harvester 10 by means of brackets 68 and 69, respectively. Carrier plates 45' and 46' of module 25' are mounted for rolling movement in channels 61 and 66 by means of rollers which correspond to rollers 60 and 67 and which are designed by these numerals to which a prime has been added.

During harvesting the shaker arms 18-18' and 17-17' are oscillated back and forth while in engagement with the grapevines as the harvester travels along the row. More specifically, for the single curtain type of grapevine formation, such as shown in FIGS. 2 and 3, while arms 18 and 18' pivot simultaneously in the direction of arrows 70 and 70', respectively, (FIG. 7), arms 17 and 17' will pivot in the direction of arrows 71 and 71', respectively. Furthermore, when arms 18 and 18' pivot in the direction of arrows 72 and 72', respectively, arms 17 and 17' will pivot in the direction of arrows 73 and 73', respectively. In order to effect the foregoing pivotal motion of arms 18-18' and 17-17', the output shaft 76 of hydraulic motor 74 drives gear 77 which is located in gear box 78 secured to module plate 70a by means of brackets 75. Gear 77 is in mesh with gear 79 which is keyed to shaft 80 coupled by sleeve 81 to drive shaft 82 journalled in bearings 83 and 84 securely mounted on members 33 and 34, respectively of module 25. Extension 86 of shaft 76 merges at universal 87 with splined shaft 88 which is telescopically received within hollow shaft 89 which terminates at universal 90 which in turn is coupled to shaft 91 which is keyed to gear 77' which is in mesh with gear 79' located in gear box 78'. Gear 79' is keyed to shaft 80' which is keyed to sleeve 81' keyed to drive shaft 82' which is analogous to drive shaft 82 in module 25. Again, the primed numerals relating to module 25' designate elements of structure having unprimed like numerals on module 25. The splined telescoping connection between shaft 88 and hollow shaft 89 permits the drive to be maintained to shafts 82 and 82', notwithstanding that the spacing between modules 25 and 25' may be varied, either when they move independently of each other, as described in detail hereafter, or when the spacing between them is adjusted incidental to setting them for joint coupled movement, as also described in detail hereafter.

The shaker arms 18-18' and 17-17' are oscillated back and forth in the above described manner because they are effectively connected to a plurality of eccentrics 95, 96, 97 and 98 keyed to shaft 82. More specifically, eccentrics 95 and 97 are journalled within collars 99 and 100, respectively, and said collars are attached to first ends of turnbuckle links 101 and 102, respectively, which have their opposite ends pivotally mounted on pins 103 and 104, respectively, which form part of a clevis connection with arms 105 and 106, respectively, (FIGS. 6 and 8) of a bellcrank type of lever having a central portion 107 (FIG. 6) having its opposite ends journalled in bearings 108 and 109 on module 25 and having arms 18b to which shaker arms 18 are attached. It will be readily appreciated therefore that as shaft 82 rotates, collars 95 and 97 will be moved back and forth to cause arms 18 to oscillate back and forth. The range of movement of arms 18 may be adjusted by varying the adjustments of the turnbuckle links 101 and 102.

Arms 17 (FIG. 8) are oscillated in a similar manner simultaneously with the oscillation of arms 18. More specifically, eccentrics 96 and 98 which are keyed to shaft 82 are encircled by collars 110 and 111 to which first ends of turnbuckle links 112 and 113, respectively, are secured and which in turn have their opposite ends pivotally mounted on pins 114 and 115 mounted at the ends of arms 116 and 117, respectively, which extend from the central portion of a bellcrank lever 127 having its opposite ends journalled in bearings 118 and 119 to which arms 17b are secured which form the other arms of the bellcrank lever, said arms 17b mounting shaker arms 17. As noted above, by adjusting the turnbuckles on links 112 and 113, the range of movement of arms 17 may be adjusted. It is also to be noted that eccentrics 95 and 97 are 180° out of phase with eccentrics 96 and 98 so that as arms 18 oscillate in the direction of arrow 70 (FIG. 7), arms 17 will oscillate in the opposite direction as indicated by arrow 71, and vice versa. The drive linkage associated with shaft 82' of module 25' is essentially the mirror image of that described relative to module 25, and it will be noted that the primed structure designated by numerals appearing relative to module 25' correspond to the structure designated by the unprimed numerals located on module 25. Suitable structure (not shown) is provided for varying the vertical position of arms 18-18' and 17-17' by adjustably mounting the bases of arms 18b, 17b, 18'b and 17'b to which arms 18, 17, 18' and 17', respectively, are attached on pivot portions 107, 127, 107' and 127', respectively.

Summarizing the foregoing, as the harvester 10 moves from right to left in FIG. 1, arms 18 and 18' will move simultaneously in the direction of arrows 70 and 70' and arms 17 and 17' will move simultaneously in the direction of arrows 71 and 71', respectively. In addition, when arms 18 and 18' move simultaneously in the direction of arrows 72 and 72', respectively, arms 17 and 17' will move simultaneously in the direction of arrows 73 and 73', respectively. It is to be noted especially from FIG. 4 that since arms 18' are on a different level than arms 18 and since arms 17' are on a different level than arms 17, there will be a compound movement applied to the grapevine because arms 18 and 17' will be moving in opposite directions at the same time and arms 17 and 18' will be moving in opposite directions at the same time to thereby provide an undulating pressure on the grapevine of FIG. 2 which is located therebetween. As will become apparent hereafter, there are certain circumstances under which it is desirable to change the pattern of movement of arms 17-17' and 18-18' and this may be effected, for example, by removing pin 120 (FIG. 6) of universal 90, pulling the universal apart and rotating one portion, such as 91, through 180° and thereafter reinserting pin 120. This will cause a different pattern of arm movement than described above, namely, a movement wherein arms 18 and 18' simultaneously move toward each other or away from each other, and the same is true of arms 17 and 17'. This type of action may be desired with other types of grapevine formations, as will become more apparent hereafter.

The modules 25-25', as shown in FIGS. 5-8, are mounted for relatively free rectilinear reciprocating coupled movement wherein they roll along channels 61 and 66 so as to follow the undulating nature of the growth grapevines 122, as shown in FIG. 2. In this respect it is to be noted that the vines 123 are supported by wires 124 which are strung between posts 125. It is well understood the growth will not be perfectly straight but will vary in an undulating manner in plan as determined by the characteristics of the particular plants. It will therefore be appreciated that if modules 25-25' were rigidly fixed on harvester 10, and not free to move, there would be certain places where the pressure of the arms and the fingers mounted thereon on the grapevines would not be sufficient to harvest the grapes and there would be other situations where there would be a force which was excessive and which could damage the grapevines. It is for this reason that modules 25-25' are coupled for movement together along channels 61 and 66, as required in following the contour of the grapevines.

At this point it is to be noted that fingers 18f, 18'f, 17f and 17'f are located at the ends of arms 18, 18', 17 and 17', respectively. As can be seen from FIG. 7, these fingers extend inwardly toward the opposite sides of the vines and in addition are tilted upwardly with respect to the horizontal (FIG. 8). The fingers will therefore provide a stripping action on the clumps of grapes 126 in addition to the shaking movement provided to the vines as a whole by arms 18-18' and 17-17'. It is this combination of shaking and stripping movement which produces a maximum yield of grapes from the vines during harvesting. By way of broad description, each arm, such as 17, carries a pair of spaced parallel fingers, such as 17f, which are formed from a single piece of rod which is bent into a generally U-shaped configuration with fingers 17f at an angle to the portions 17g with which they merge and which in turn merge with central portion 17c. A bracket 17e encircles the end of arm 17 and the fingers 17f at their junction with portions 17g, as shown in the drawings, and bolts 17h maintain the fingers assembled on arm 17. In addition, a tab 17t attached to part 17c is affixed to arm 17 by means of bolt 17k. It will be appreciated that the fingers 17f may be attached to arms 17 in any other way, if desired, and that they may take any other form and configuration as desired. Furthermore, the fingers associated with arms 18, 18' and 17' are analogous to the finger construction 17f described with respect to arm 17, and fingers 18'f are the mirror images of fingers 18f and fingers 17'f are the mirror image of fingers 17f. While all of the fingers have been shown at the same inclination to the horizontal, it may be preferable to incline fingers on the uppermost arms less than the fingers on the lower arms for certain types of harvesting.

As noted briefly above, modules 25-25' reciprocate rectilinearly along channels 61 and 66 because they are mounted on rollers and because they are coupled together when harvesting grapes from a growth formation such as shown in FIGS. 1, 2 and 3. In this respect, rod 128 extends through bores in bosses 129 and 129' which are secured, as by welding, to carrier plates 46 and 46', respectively, and set screws 130 and 130' lock rod 128 to bosses 129 and 129', respectively. In the absence of such locking, rod 128 can slide through the bores in said bosses. Springs 131 and 131' encircle the end portions of rod 128 with first ends of said springs bearing against bosses 129 and 129', respectively. The opposite end of spring 131 bears against bracket 132 which is rigidly secured to channel 61, and rod 128 slidably extends through a bore in said bracket. In this respect, bracket 132 includes a projecting portion 133 (FIGS. 5 and 7) against which spring 131 bears and through which rod 128 extends, and it also includes a body portion 134 which fits around channel 61 with flanges 135 extending from opposite sides of body portion 134. A plate 136 extends across channel 61 and the opposite ends of plate 136 are secured to flanges 135 by means of bolts 137. Because of this construction, stop 132 may be clamped to channel 61 at any particular location to produce any desired compression of spring 131. A bracket, such as 132' and which is the mirror image of bracket 132 and which functions in the same manner, is located at the opposite end of spring 131' from boss 129'. A bracket 132a, which is the mirror image of bracket 132, is attached to channel 66 and bears against the one end of spring 131a which is analogous to spring 131, which bears against boss 129a which is analogous to boss 129 but which is mounted on carrier plate 45. A set screw 130a secures rod 128a to carrier plate 45, and a set screw 130'a is associated with boss 129'a to lock rod 128a to carrier plate 45'a. Because of the foregoing construction, it can be seen that carrier plates 46 and 46' are locked to rod 128 and carrier plates 45 and 45' are locked to rod 128a. Furthermore, brackets 132 and 132' compress springs 131 and 131', and brackets 132a and a bracket (not shown) on channel 66 which is the mirror image of bracket 132' compress springs 131a and 131'a, respectively, thereby centering modules 25 and 25'. Under certain circumstances it may be desirable to eliminate springs such as 131, in which event the modules 25-25' would reciprocate freely without any biasing force applied to them.

In view of the foregoing structure which couples modules 25 and 25' together, it will be readily appreciated that as harvester 10 moves along the row of grapevines 122, as unequal pressure is sensed by the opposed arms and fingers, modules 25 and 25' will shift in unison transversely of harvester 10 to essentially follow the contour of the grapevine formation 122, as limited by the compression of the series of springs designated by the family numeral 131. As briefly noted above, the compression of the springs may be varied by changing the positions of the various brackets designated by the family numeral 132 so as to permit the modules 25-25' to move more freely or move less freely transversely of harvester 10. This adjustment may be made to suit types of grapes being harvested and the particular characteristics of the grapevines being acted on.

It is also to be noted that the spacing between modules 25 and 25' along channels 61 and 66 may be varied by simply loosening the set screws designated by the family numeral 130 associated with bosses which are designated by the family numeral 129, and by loosening the brackets designated by the family numeral 132, and by moving the modules along rods 128 and 128a until such time that the proper spacing is obtained between the modules and thereafter the set screws, designated by the family numeral 130, are tightened to lock the modules in position on their rods 128-128a. Thereafter the position of brackets designated by the family numeral 132 are adjusted to provide the proper compression of the springs designated by the family numeral 131. To define the limits of movement of modules 25-25', collars, such as 139 and 139a, are mounted on the end portions of rods 128 and 128a, respectively, and they are locked in position at any desired location by set screws 140 and 140a. Collar 139' is located on the rods 128 proximate brackets 132', and another collar (not shown) analogous to collar 139' is mounted on the right end of rod 128a in FIG. 7. It will therefore be appreciated that as modules 25' and 25 move in unison to the right in FIG. 7, rods 128 and 128a will move to the right with such modules because they are locked to the carrier plates and eventually a point will be reached when collars 139 and 139a abut brackets 132 and 132a, respectively, thereby defining the limit of movement of these modules to the right. Because there is analogous structure on the opposite ends of the rods, the limit of movement to the left of the modules can be preset in the same manner.

Essentially the same structure, which is utilized to provide the joint coupled rolling rectilinear movement of modules 25-25', as described above with respect to FIGS. 5-8, can be utilized to convert the harvester 10 to an arrangement wherein each module 25 and 25' moves independently of the other, as required by its engagement with the opposite sides of any type of grapevine. This movement can be used with the single curtain type of growth shown in FIGS. 2 and 3, if desired, and it can be used with any of the other types of growth such as shown in FIGS. 12-18, as desired. By way of brief background, in FIGS. 12-14 a formation known as the Geneva double curtain is shown. In this type of formation each post 141 is provided with a pair of cross arms 142 pivotally mounted thereon by pin 143. The upper ends of cross arms 142 are supported by wires 143' which extend between post 141 and the upper ends of arms 142. The trunks 144 of the grapevines are positioned between posts 141 as shown in FIGS. 13 and 14 and the cordons of alternate plants are trained along opposite wires 145 which are strung between the arms 142 of adjacent posts. It is to be noted that there is a catenary between arms of adjacent posts, as shown in FIG. 13. In addition, wires 145 will be closest together in plan (FIG. 14) at the midpoint between adjacent posts because they are drawn to this position by the grapevines. It will therefore be appreciated that in order to maintain optimum contact with the vines supported by wires 145, modules 25 and 25' will have to follow the orientation of wires 145, and this means that the modules will have to move toward each other at the central portions of the wire spans and away from each other at the posts.

The module suspension shown in FIGS. 9-11 provides for independent rectilinear reciprocating movement of modules 25 and 25' to meet the above described conditions and any others which may be encountered. In view of the fact that the modules and the other structure is generally the same in FIGS. 9-11 as described above with respect to FIGS. 5-8, a repetition of such structure will be omitted and the ensuing description will be confined to the salient points of difference. However, it will be noted that various numerals will appear in FIGS. 9-11, and where numerals are the same as the identical numerals in FIGS. 5-8, they will designate the same elements of structure. To obtain independent reciprocating rectilinear movement of modules 25 and 25', the following adjustments are performed. Collars 152 and 152' (FIG. 7) which are mounted loosely on shaft 128 are moved from the position of FIG. 7 to the position of FIGS. 9 and 11 in abutting relationship with bosses 129 and 129', respectively, and set screws 130 and 130' in the bosses are loosened or removed to permit a sliding relationship between rod 128 and bosses 129-129'. Set screws 153 and 153' are used to lock collars 152 and 152', respectively, to shaft 128. The spacing between the locked collars 152 and 152' determines the minimum spacing between the modules. Brackets 132 and 132' are locked to channel 61 at predetermined locations to adjust the compression of springs 131 and 131'. In addition, collars 139 and 139' are moved into abutting relationship with a channel bridge 154 which is rigidly secured across the ends of channels 61 and 66 (FIG. 11). A corresponding channel bridge, analogous to 154, is located in the same relationship to channels 61 and 66 on the opposite side of module 25'. At this point, it is to be noted that the ends of rods 128 and 128a extend loosely through suitable apertures in bridge 154 and its counterpart 154' on the opposite side of the harvester. The same steps described above are performed relative to the various fittings, such as collars 152a and 152'a and collars 139a and 132a on both sides of modules 25 and 25'. It will therefore be seen that rods 128 and 128a are locked relative to channels 61 and 66 by means of the abutting relationship between collars 139 and 139a with bridge 154 and because of the mirror image relationship of the counterpart collars and bridge 154' on the opposite ends of channels 61 and 66. The series of collars designated by family numeral 152 will abut the bosses designated by family numeral 129 to limit the inward movement of modules 25 and 25' toward each other under the bias of the respective springs designated by family numeral 131. Since the rods 128 and 128a cannot slide through the bosses designated by family numeral 129 and brackets designated by family numeral 132, as the arms on each module encounter greater resistance from the grapevines with which they are in contact, the modules will move outwardly, independently of each other, against the bias of the springs associated therewith, and when the obstruction or force moving them apart outwardly is removed or diminished, the springs 131 will expand to move the modules 25 and 25', independently of each other toward the centerline of the machine. It will thus be seen that the foregoing construction wherein the modules 25 and 25' are mounted for rolling movement independently of each other relative to the plants, will permit optimum engagement of the arms and fingers carried thereby with a formation having a contour in plan such as shown in FIG. 14 wherein the vines on the wires 145 cyclically approach and recede from the centerline of the machine. This type of module movement is desirable for any type of grapevine formation wherein the opposite sides depart from parallelism.

In addition to permitting free rectilinear reciprocating movement of the modules independently of each other as described above, it is desirable to incline modules 25 and 25' from the vertical to a position such as shown in FIGS. 9 and 10 when harvesting the Geneva double curtain grapevine formations depicted in FIGS. 12–15. In this respect, the Geneva double curtain essentially includes two spaced curtains 156 which hang relatively free with nothing between them to hold them outwardly to force them into engagement with the arms and fingers on the harvesting modules. It will be also appreciated that there is more resistance to inward movement of curtains 156 toward each other close to wires 145 than there is on the portions of the curtains closer to the ground. Therefore to provide additional force of contact between the arms and the fingers with the lower portions of curtains 156, structure is provided for inclining modules 25 and 25'. While this structure will be described only with respect to module 25, it will be appreciated that analogous counterpart structure exists on the other module. In this respect, carrier plate 46 includes a plurality of spaced apertures 157 which lie on circular arc 158 having its center at aperture 159 through which bolt 50 extends and which secures tab 47 of module 25 to plate 46 in a pivotal manner. Therefore, if it is desired to change the angle of inclination of module 25, it is merely necessary to remove bolt 51 from engagement with carrier plate 46 and tab 48 forming a part of module 25 and thereafter pivot module 25 about bolt 50 to any desired position and thereafter reinsert both 51 through the aligned aperture in the tab 48 and aperture 157 in plate 46. The foregoing procedure is effected with bolts 55 and 56 associated with carrier plate 45 (FIG. 8) so that the module 25 will be locked in an inclined position relative to its carrier plates 45 and 46. Thereafter, an analogous counterpart type of adjustment is effected relative to carrier plates 45' and 46' with bolts which are located in mirror image relationship to bolts 50–51 and 55–56. It is to be again noted that the primed numerals associated with the structure for supporting module 25' represents identical or mirror image structure designated by like unprimed numerals with respect to module 25. When the inclination of modules 25 and 25' has been adjusted to the desired positions, they will assume an orientation relative to each other such as shown in FIG. 15 so as to cause gravity to assist in the harvesting of grapes by causing the vertical component of the weight of the curtains 156 to bear against the arms and the fingers and therefore provide a greater engagement force therebetween. At this point it will be appreciated that while the modules were described as being movable independently of each other for use with the Geneva double curtain growth, it will be appreciated that under certain circumstances it may be desirable to couple them for joint movement, as described above relative to FIGS. 5–8 and this may be effected as desired simply and easily by merely varying the set-up of the harvester by manipulating the pertinent elements of structure.

At this point it is to be noted that the drive to drive shaft 82 (FIG. 10) permits the inclination of module 25 to be effected without difficulty because in moving from the vertical orientation shown in FIG. 6 to the inclined orientation shown in FIG. 10, the parts of universal 87 merely change their orientation to that shown in FIG. 10. Universal 90 acts in the same way with respect to module 25'. Thus, the modules may be moved to any desired inclination without necessity of having to in any way work or readjust the drives thereto.

The universality of the present machine permits it to be used with various types of grapevines and with different types of terrain. In this respect, for example, in FIG. 16 a T-top type of post 161 is shown including a horizontal cross bar 162 with a rigid link 163 therebetween with spaced wires 164 supported by cross bar 162. In this type of formation the grapevines occupy the entire distance between the outer edges of the growth and they generally do not form curtains such as described above with respect to FIG. 12. In harvesting of this type it may be desirable to adjust the modules at equal angles about the vertical centerline, such as shown in FIG. 19, and it may be desirable to mount the modules for the independent movement described above with respect to FIGS. 9–11 or the coupled movement such as described above with respect to FIGS. 5–8, depending on various conditions in the field including the type of grapes being harvested.

In FIG. 17 a slant-type of post construction is shown which includes a vertical post 166 having a slanted cross bar 167 secured thereto by pin 168 with a rigid link 169 therebetween, as shown, with cross bar 167 supporting spaced wires 170. In an arrangement of this type it may be desirable to adjust modules 25 and 25' at unequal angles so that better access may be had to the growth, as shown in FIG. 20. This adjustment can be made easily and simply as described above.

In FIG. 18 a single curtain growth is shown on an incline. Therefore, it will be appreciated that when the harvester travels along the incline, if the modules 25-25' were held in position relative to the harvester frame in the orientation disclosed in FIG. 4, they would be at an angle to post 125. In order to cause them to be parallel to post 125, they are inclined in the manner described above relative to FIGS. 9-11. In this respect both modules are pivoted in a counter-clockwise direction as shown in FIG. 9 so that lower portion of module 25 would be moved toward the centerline of the harvester and the lower portion of module 25' would be moved away from the centerline of the harvester. In order to achieve the latter, an additional aperture 172' (FIG. 6) is formed in carrier plate 46', and this aperture is located above the horizontal centerline joining the aperture through which bolt 50' extends and the aperture through which bolt 51' is shown in FIG. 6. It will be appreciated that moving tab 48' up so that the aperture therein is in line with aperture 172' will cause the lower end of module 25' to swing toward the right in FIG. 6. An analogous counterpart aperture 172 is formed in plate 46 and additional apertures analogous to apertures 172 and 172' are formed in plates 45 and 45'. In fact, any number of apertures may be used, as required, to provide a design which will give any degree of pivotal movement of the modules to either side of their vertical centerlines in both directions. With the module 25 pivoted in a clockwise direction and module 25' also pivoted in a clockwise direction, they will assume parallelism to each other as shown in FIG. 21, but both of the modules will be inclined relative to the centerline of the harvester 10.

In FIG. 22 an alternate embodiment of the present invention is shown for effecting coupled movement of the modules of the type described above with respect to FIGS. 5-8. This embodiment eliminates the spring family 131 and utilizes instead a fluid cylinder 175 which is rigidly affixed to a cross brace 176 extending between main frame members 62 and 64. A piston 177 is attached to piston rod 178 which in turn is attached to cable 179 which in turn is affixed to rod 128 at 180. As will be recalled from the preceding description, rod 128 is affixed to carrier plates 46 and 46' at bosses 129 and 129', respectively, by means of set screws 130 and 130', respectively. At this point it will be noted that the modules 25-25' and their supporting structure are identical in all respects to that described above relative to FIGS. 5-8, except that springs and their associated structure have been eliminated. In operation, as a force tends to move the coupled modules 25-25' to the right or to the left, such movement will be effected against the fluid pressure within cylinder 175. As the rod 128 moves to the right or left, cable 179 will follow it as guided by pulleys 181 or 182 mounted on block 183 secured to channel 61. The advantage of the construction shown in FIG. 22 over the spring construction shown in FIGS. 5-8 is that the force opposing movement will not build up as would be the case with the springs. In other words the force opposing movement of the modules will always be uniform because the pressure of the fluid in chamber 184 of cylinder 175 can be controlled by the means of a pressure relief valve or the like so that the force opposing movement of the modules provided by the piston and cylinder 175-177 will always be equal at all positions of modules 25 and 25'. The fluid pressure in cylinder 175 may be adjusted to any predetermined value to provide the desired force of the arms on the vines. Because of this construction modules 25 and 25' can experience a large range of movement transversely of harvester 10, and the force opposing movement at any position of the module will always be the same. It will be appreciated that cylinder 175 is supplied with fluid at a constant pressure from a suitable source (not shown), which may be hydraulic or pneumatic.

In FIG. 23 a modified embodiment of the structure for providing independent movement of the modules described above relative to FIGS. 9-11 is shown. This embodiment utilizes a fluid cylinder arrangement for the same reasons noted above with respect to FIG. 22, namely, to cause the force opposing the movement of each of the modules to remain equal regardless of the position of the modules, this type of operation being incapable of achievement by means of springs which will build up a resisting force as they are compressed. In the embodiment of FIG. 23 cross bar 186 is secured between the frame members 62 and 64 and a fluid cylinder 187 is secured to cross brace 186. A piston 188 within cylinder 187 is affixed to piston rod 189 which in turn carries pulley 190 at its outer end. A cable 191 encircles pulley 190 with one end of cable 191 being rigidly affixed to boss 129 by means of set screw 130 and the opposite end of the cable being rigidly affixed to boss 129' by means of set screw 130'. Intermediate portions of the cable 191 pass around pulleys 192 and 192' which are mounted on brackets 193 and 193' rigidly clamped to channel 61. Plate 46 abuts adjustable stop 194 rigidly clamped on channel 61 and plate 46' abuts adjustable stop 194' also rigidly clamped to channel 61. It will thus be seen that as there is a force tending to move module 25 to the left, piston 188 will be pulled downwardly to follow pulley 190 while bracket 194' prevents plate 46' of module 25' from moving to the left. Conversely if there is a force tending to move module 25' to the right, pulley 190 will move downwardly under the resistance provided by piston 188 while stop 194 prevents plate 46 from moving to the right. In addition, modules 25 and 25' may move apart simultaneously and in this situation piston 188 will be pulled downwardly to follow pulley 190 to which it is attached and as the force moving the modules apart is removed, they will move together or either one will move in toward its respective stop 194 or 194'. As noted above, relative to FIG. 22, the force resisting outward movement of modules 25 and 25' will remain constant regardless of the position of such modules because the fluid pressure within said cylinder 187 may be maintained at a predetermined value by a suitable pressure relief valve or the like. In addition, the fluid pressure in the cylinder may be adjusted by varying the setting of the pressure relief valve to provide any desired degree of force of the arms on the plants. It will be appreciated that cylinder 187 is supplied with fluid at a constant pressure from a suitable source (not shown) which may be hydraulic or pneumatic.

In FIG. 24 a modified form of the present invention is disclosed for use in an arrangement wherein the modules 25-25' are coupled for movement together, as described above with respect to FIGS. 5-8. This embodiment permits varying the spacing of the distance between these modules from a remote position as may be required in the field while the harvester is in operation to meet changing conditions as they are encountered. In this respect, boss 129 of plate 46 is attached to piston rod 197 of fluid motor 198, the cylinder 199 of which is rigidly affixed to collar 200 which may be adjustably fixedly secured to rod 128. By varying the position of piston 201 by admitting pressurized fluid from a suitable source of pressurized fluid (not shown) to one side or the other of said piston, the position of carrier 46 may be varied with respect to rod 128. An analogous piston and cylinder arrangement may be associated with boss 129' of carrier plate 46' and as will be readily understood from the above description, analogous piston and cylinder arrangements and related structure will be associated with carrier plates 45 and 45'. Therefore, by moving actuating pistons such as 201 of all of the cylinders such as 198 simultaneously by admitting pressurized fluid thereto on the required sides of the pistons, modules 25 and 25' may be drawn closer together or moved further apart and thereafter the fluid pressure circuit is closed so as to lock the pistons such as 201 in a predetermined position and thus lock the carrier plates 46-46' and 45-45' in position relative to rods 128 and 128a (FIG. 7) to thereby permit the modules to move jointly in coupled condition as required. Preferably, hydraulic fluid is used for actuating motors such as 198.

In FIG. 25 a modified form of the invention is shown which permits independent movement of modules 25 and 25' as described above relative to FIGS. 9–11 while also permitting adjustment of the spacing between the modules from a remote position to meet varying conditions encountered in the field. In this respect, a collar 203 is adjustably fixedly secured to shaft 128 and a cylinder 204 is rigidly affixed to collar 203 and the piston rod 205 which is coupled to piston 206 has an end plate 207 which abuts boss 129 which is rigidly secured to carrier plate 46. Rod 128 may be fixed against axial movement in the manner described above relative to FIGS. 9–11. Furthermore, a suitable spring arrangement which may be identical to that shown in FIGS. 9–11 biases boss 129 to the right. Analogous structure is supplied relative to boss 129' of carrier plate 46' and relative to carrier plates 45 and 45', as readily can be visualized. If it is desired to move plate 46 which supports module 25 to the left, it is merely necessary to move piston 206 to the left by suitable control of the fluid from a suitable source of pressurized fluid (not shown) to cylinder 204 to thereby move boss 129 and plate 46 secured thereto to the left. The corresponding fluid cylinder associated with plate 45 is actuated at the same time. Futhermore, hydraulic motors such as 204 which are associated with carrier plates 45' and 46' on module 25' are also actuated at the same time. By means of the foregoing structure, modules 25 and 25' can be spread apart or moved closer together from a remote position to meet the necessities of any particular situation, and further after they have been moved to their desired position, the hydraulic circuit is closed to provide a hydraulic lock which holds pistons such as 206 and all the analogous pistons in the position to which they were moved by the fluid. Preferably hydraulic fluid is used for the motors such as 204.

A still further embodiment of the present invention is disclosed in FIG. 26 wherein two hydraulic motors are associated with each of the modules and are located between the carrier plates and each module itself so as to vary the inclination of the modules from a remote position. More specifically, the piston rod 218 associated with piston 216 located within fluid cylinder 210 has bracket 220 at the end thereof which is pivotally mounted on pin 22 attached to carrier plate 46. The opposite end of cylinder 210 is pivotally connected to bracket 215 attached to module 25 by means of pin 214 which extends through tab 212 secured to the end of cylinder 210. Suitable hoses 221 and 223 are in communication with the chambers within cylinder 210 at the opposite sides of piston 216. An analogous counterpart (not shown) to piston 216 and cylinder 210 is connected to carrier plate 45 on the opposite side of module 25, and another pair of counterpart piston and cylinders (not shown) equivalent to 216 and 210 are connected between module 25' and plates 46' and 45' which support it. A suitable source of fluid pressure (not shown), preferably hydraulic, is provided to conduct hydraulic fluid to the chambers on the opposite sides of piston 216 to pivot module 25 about pin 50 which pivotally mounts it on plate 46 and about a counterpart pin (not shown) on plate 45. Hydraulic fluid is supplied in an analogous manner to the other piston and cylinders associated with module 25', it being understood that the hydraulic fluid is supplied to both cylinders of a module simultaneously. The foregoing mounting for modules 25 and 25' will enable inclination of the modules 25 and 25' to be varied from a remote position as required while the harvester is moving along a row of grapevines. This would be desirable as the slope of the terrain changes which in turn changes the inclination of the harvester frame relative to the grapevines, and therefore by varying the inclination of the harvester modules they may be maintained in the same relative position to the grapevines notwithstanding a change in orientation of the frame of the vehicle to the grapevines. In addition, relative to the embodiments of FIGS. 24 and 25, there may be times when it is desirable to move the modules apart or make them come closer together during harvesting and this again can be effected from a remote position hydraulically thereby providing great versatility to the harvester in having such remote controls.

In the preceding description the term family numeral was used for ease of description. By way of definition, family numeral means the numeral applied to analogous and counterpart elements of structure. For example, in speaking of "springs designated by family numeral 131", it is meant to include all springs having a common numeral 131, such as springs 131, 131', 131a and 131'a.

While the above description has generally referred to arms 18 and 18' moving simultaneously in the same direction and to arms 17 and 17' moving simultaneously in the same direction, mention has been made of adjusting universal 90 so as to cause arms 18 and 18' to travel simultaneously in opposite directions and also cause arms 17 and 17' to travel simultaneously in opposite directions. This type of harvester arm movement may be utilized with the Geneva double curtain type of growth or for thick growths, as desired.

It was briefly mentioned above that the fingers at the end of the various arms need not all be inclined at the same angle. In this respect, it may be more desirable to have the uppermost fingers, such as shown in FIG. 20, inclined more horizontally than the lowermost fingers in order to obtain a better angle of attack at the grapes on the vines. Such a different inclination of these fingers may be used, as desired, whether the modules are coupled or independently movable, and whether they are straight or inclined. Furthermore, it will be understood that a series of fingers such as 18f can be inclined at a plurality of different angles, as required, for different types of operation. It will also be appreciated that the foregoing making of the upper fingers more horizontal is preferred for harvesting the Geneva double curtain shown in FIGS. 12–15 because when the fingers are more horizontal, the supporting wires, such as 145, will pass between the fingers allowing the ends of the arms 18 and 17' to strike the wires to cause the wires to vibrate and thereby aid in dislodging grapes from the vines.

While FIG. 15 discloses modules 25 and 25' inclined at equal angles to the vertical for use with Geneva double curtain types of growth, as shown in FIG. 12, it will be appreciated that under certain circumstances it may also be desirable to cause the modules to remain perfectly vertical, as shown in certain other figures, for use with the Geneva double curtain type of growth.

At this point it is to be noted from FIG. 7 that the webs (not numbered) of channels 154 and 154' have suitable apertures 157, 157a and 157' for permitting the ends of rods 128 and 128a to pass therethrough as required when they move transversely of the machine. Furthermore, it will be appreciated that rods 128 and 128a extend sufficiently far beyond the outsides of channels 154 and 154' so that they will not lose contact with the channels and therefore will be supported thereby.

It can thus be seen that the universal grape harvester of the present invention is capable of providing different types of operation whereby by simple adjustment of its operating parts, it can be changed easily and simply from one condition of operation to another condition of operation. It will also be appreciated that all of the features described above need not necessarily be incorporated into a single harvester, but if desired, select features may be utilized while others may be abandoned, if so desired, and further any of the features may be combined with any of the other features where they are not mutually exclusive.

While preferred embodiments of the present invention have been disclosed, it will be appreciated that the present invention is not limited thereto but may be otherwise embodied within the scope of the following claims. In addition, while the harvesting machine of the present invention has been described with respect to grapevines, it will be appreciated that it may have applicability in the harvesting of other produce from plants grown in a row.

What is claimed is:

1. A grape harvester for harvesting grapes from a row of grapevines comprising frame means for movement alongside said row of grapevines, first and second spaced harvesting arm means adapted to be located in straddling relationship to said row of grapevines, first and second module means mounting said first and second harvesting arm means, respectively, and mounting means mounting said first and second module means on said frame means for selective coupled free reciprocating rectilinear movement transversely of said row of grapevines or for selective independent free rectilinear reciprocating movement transversely of said row of grapevines.

2. A machine as set forth in claim 1 including spacing means for selectively varying the spacing between said first and second harvesting arm means.

3. A machine as set forth in claim 1 including means for biasing said first and second arm means to a predetermined position on said frame when said arm means are mounted for said coupled reciprocating rectilinear movement.

4. A machine as set forth in claim 3 including spacing means for selectively varying the spacing between said first and second harvesting arm means.

5. A machine as set forth in claim 1 including adjusting means for adjusting at least one of said first and second arm means to a position which assumes an attitude inclined to the vertical until said arm means are readjusted to a different attitude by said adjusting means.

6. A machine as set forth in claim 5 including spacing means for selectively varying the spacing between said first and second harvesting arm means.

7. A grape harvester for harvesting grapes from a row of grapevines comprising frame means having a front end and a rear end for movement alongside said row of grapevines, first and second spaced harvesting arm means adapted to be located in straddling relationship to said row of grapevines, first and second module means mounting said first and second harvesting arm means, respectively, and mounting means mounting said first and second module means on said frame means for coupled free reciprocating movement transversely of said row of grapevines, said first and second arm means comprising first and second series of arms, respectively, each of said arms having front and rear ends, pivot means on said module means mounting said front ends of said first and second arms on said first and second module means, respectively, while permitting the rear ends of said arms to be free and extend toward said rear end of said frame, means on said first and second module means for oscillating said first and second arms toward and away from said row of grapevines to thereby shake said grapes therefrom, each of said module means having upper and lower portions, said mounting means comprising track means mounted on and extending across said frame means, roller means on said track means for supporting said first and second module means for rolling movement transversely of said row of grapevines, and said mounting means including means for varying the inclination of said first and second arm means to the vertical comprising bracket means located between said roller means and said upper portions of said module means supporting said module means in an inclined attitude with their lower portions being closer to each other than said upper portions.

8. A grape harvester as set forth in claim 7 including biasing means biasing said modules toward a central position on said frame.

9. A grape harvester as set forth in claim 8 wherein said biasing means comprises first boss means on said bracket means, bracket means on said frame, and spring means between said boss means and said bracket means.

10. A grape harvester as set forth in claim 9 including means for varying the spacing between said boss means and said bracket means to thereby vary the biasing force on said modules.

11. A grape harvester as set forth in claim 8 including means for varying the spacing between said modules.

12. A grape harvester as set forth in claim 7 wherein said bracket means comprise first and second brackets, and wherein said mounting means comprise a rod extending between said first and second brackets, and means fixedly securing said rod to said first and second brackets.

13. A machine for harvesting grapes from a row of grapevines comprising frame means for movement alongside said row of grapevines, first and second spaced harvesting arm means adapted to be located in straddling relationship to said row of grapevines, first and second module means mounting said first and second arm means, respectively, upper and lower portions on said module means, first mounting means mounting said first and second module means on said frame means for free reciprocating movement transversely of said frame means and said row of grapevines as guided by the position of said grapevines, said first and second arm means comprising first and second series of arms on said first and second module means, respectively, means on said first and second module means for oscillating said first and second series of arms toward and away from said row of grapevines to thereby shake said grapes therefrom, said mounting means comprising track means extending across said frame means, roller means on said track means for supporting said first and second module means for rolling movement transversely of said row of grapevines, and second mounting means mounting said module means and said first and second arms on said frame with their upper portions spaced further apart than their lower portions whereby said first and second module means and said first and second arms may converge downwardly toward each other.

14. A machine for harvesting grapes from a row of grapevines comprising frame means having a front end and a rear end of movement alongside said row of grapevines, module means, harvesting arm means mounted on said module means, mounting means mounting said module means on said frame means for free reciprocating movement transversely of said row of grapevines during harvesting, said arm means comprising elongated members having front ends and rear ends, means pivotally mounting said front ends on said module means while permitting said rear ends to be free and extend toward said rear end of said frame means, means mounted on said module means for oscillating said elongated members toward and away from said row of grapevines to thereby shake said grapes therefrom, said mounting means comprising track means mounted on and extending across said frame means, and roller means on said track means for supporting said module means for rolling movement transversely of said row of grapevines.

15. A machine for harvesting grapes from a row of grapevines comprising frame means for movement alongside said row of grapevines, harvesting arm means, first mounting means mounting said harvesting arm means on said frame means and permitting said harvesting arm means to reciprocate freely transversely on said frame means relative to said row of grapevines, second mounting means effectively coupled to said harvesting arm means mounting said harvesting arm means in a predetermined inclined attitude to the vertical relative to said frame means to provide an orientation relative to the frame means which is maintained regardless of the attitude of said frame means on the ground and regardless of the degree of contact between the arms and the grapevines, and means for oscillating said harvesting arm means toward and away from said row of grapevines, said harvesting arm means comprising a plurality of arms and a plurality of fingers on said arms with certain of said fingers on certain of said arms being inclined to the vertical at different angles than fingers on other of said arms.

16. A machine for harvesting grapes from a row of grapevines comprising frame means for movement alongside said row of grapevines, module means, harvesting arm means mounted on said module means, and mounting means mounting said module means on said frame means for free reciprocating movement transversely of said row of grapevines during harvesting, said harvesting arm means being inclined with respect to the vertical, and said harvesting arm means comprising a plurality of arms which include a plurality of fingers for engaging said grapevines, with certain of said fingers on certain of said arms being inclined at different angles to the vertical than fingers on other of said arms.

17. A machine as set forth in claim 13 including means for varying the inclination of at least one of said first and second arm means to the vertical.

18. A machine as set forth in claim 2 wherein said spacing means comprise means for varying said spacing from a remote position.

19. A machine as set forth in claim 1 including means for biasing said first and second arm means toward each other when said first and second arm means are mounted for said independent reciprocating rectilinear movement.

20. A machine as set forth in claim 9 including spacing means for selectively varying the spacing between said first and second harvesting arm means.

* * * * *

UNITED STATES PATENT AND TRADEMARK OFFICE
CERTIFICATE OF CORRECTION

PATENT NO. : 4,063,406

DATED : December 20, 1977

INVENTOR(S) : Charles G. Burton

It is certified that error appears in the above-identified patent and that said Letters Patent are hereby corrected as shown below:

In the abstract, line 15, change "first adjusters" to --second adjusters--.
    Column 6, line 10, change "designed" to --designated--.
    Column 12, line 6, change "both" to --bolt--.
    Column 16, line 55, after "for" insert --other--.
    Column 19, line 26 (claim 14), change "of" (first occurrence) to --for--.
    Column 20, line 44 (claim 20), change "9" to --19--.

Signed and Sealed this

Twenty-fifth Day of April 1978

[SEAL]

Attest:

RUTH C. MASON
Attesting Officer

LUTRELLE F. PARKER
Acting Commissioner of Patents and Trademarks